United States Patent
Jensen et al.

(10) Patent No.: US 7,337,399 B2
(45) Date of Patent: Feb. 26, 2008

(54) APPARATUS, SYSTEM, AND METHOD FOR EDITING A REGION OF A DOCUMENT INTERSECTING MULTIPLE CONTENT COMPONENT TYPES IN A SINGLE OPERATION

(75) Inventors: Michael R. Jensen, Frisco, TX (US); Ronald Earl Van Buskirk, II, Louisville, CO (US); Ivan Valentine Woehr, Lafayette, CO (US)

(73) Assignee: InfoPrint Solutions Company, Boulder, CO (US)

( * ) Notice: Subject to any disclaimer, the term of this patent is extended or adjusted under 35 U.S.C. 154(b) by 237 days.

(21) Appl. No.: 11/028,118

(22) Filed: Jan. 3, 2005

(65) Prior Publication Data

US 2006/0150089 A1   Jul. 6, 2006

(51) Int. Cl.
G06F 15/00 (2006.01)
G06K 15/00 (2006.01)
H04N 1/60 (2006.01)

(52) U.S. Cl. .................. 715/530; 358/2.1; 358/1.9; 715/515

(58) Field of Classification Search ............ 715/530, 715/515, 810, 856; 358/1.9, 2.1
See application file for complete search history.

(56) References Cited

U.S. PATENT DOCUMENTS

| | | | |
|---|---|---|---|
| 4,503,556 A | 3/1985 | Scherl et al. ............ | 382/9 |
| 4,577,235 A | 3/1986 | Kannapell et al. ........ | 358/280 |
| 4,668,995 A | 5/1987 | Chen et al. .............. | 358/282 |
| 4,686,522 A | 8/1987 | Hernandez et al. ....... | 340/709 |
| 4,723,211 A * | 2/1988 | Barker et al. ............ | 715/514 |
| RE32,632 E | 3/1988 | Atkinson ................. | 340/709 |
| 4,815,029 A | 3/1989 | Barker et al. ........... | 364/900 |
| 4,962,475 A | 10/1990 | Hernandez et al. ...... | 364/900 |
| 5,377,330 A * | 12/1994 | Kubota et al. ........... | 715/530 |
| 5,408,599 A * | 4/1995 | Nomura et al. .......... | 715/516 |
| 5,664,208 A * | 9/1997 | Pavley et al. ........... | 715/515 |
| 5,713,032 A * | 1/1998 | Spencer .................. | 715/515 |
| 5,734,761 A * | 3/1998 | Bagley ................... | 382/309 |

(Continued)

OTHER PUBLICATIONS

Millhollon et al., Micrsoft Office Word 2003 Inside Out, Nov. 5, 2003, Microsoft Press.*

(Continued)

Primary Examiner—John Cabeca
Assistant Examiner—Nicholas S Ulrich
(74) Attorney, Agent, or Firm—Duft Bornsen & Fishman, LLP

(57) ABSTRACT

An apparatus, system, and method are disclosed for editing a region of a document intersecting multiple content component types in a single operation. The apparatus includes an input module, a function module, an identification module, a document editing module, and an output module. The input module receives a description of a region of a document. The region intersects a plurality of content component types. The function module obtains a function to be applied to the region. The identification module identifies a set of content components intersecting the region. The document editing module processes intersecting portions of the content components using the function. The output module updates the document with processed intersecting portions of the content components. The apparatus may additionally include a format module that determines an acceptable content component format for the function and a conversion module that converts the intersecting portions of the content components to the acceptable format.

19 Claims, 6 Drawing Sheets

U.S. PATENT DOCUMENTS

| | | | |
|---|---|---|---|
| 5,740,455 A * | 4/1998 | Pavley et al. | 715/515 |
| 5,745,910 A * | 4/1998 | Piersol et al. | 715/515 |
| 5,845,304 A * | 12/1998 | Iijima | 715/530 |
| 5,926,565 A * | 7/1999 | Froessl | 382/181 |
| 6,044,387 A * | 3/2000 | Angiulo et al. | 715/533 |
| 6,154,756 A | 11/2000 | Hearn et al. | 707/530 |
| 6,320,601 B1 * | 11/2001 | Takasu et al. | 715/764 |
| 6,384,851 B1 * | 5/2002 | Takasu et al. | 715/866 |
| 6,397,233 B1 * | 5/2002 | Okawa et al. | 715/530 |
| 6,683,631 B2 * | 1/2004 | Carroll | 715/821 |
| 6,715,127 B1 * | 3/2004 | Eschbach et al. | 715/502 |
| 6,928,618 B2 * | 8/2005 | Kohls et al. | 715/764 |
| 6,976,223 B1 * | 12/2005 | Nitschke | 715/764 |
| 2005/0254859 A1 * | 11/2005 | Kim et al. | 399/182 |

OTHER PUBLICATIONS

Microsoft Office Word 2003 Step by Step, Sep. 24, 2003, Microsoft Press.*

IBM Technical Disclosure Bulletin vol. 29. No. 5 Oct. 1986.

IBM Technical Disclosure Bulletin vol. 31. No. 2 Jul. 1988.

\* cited by examiner

APPARATUS, SYSTEM, AND METHOD FOR EDITING A REGION OF A DOCUMENT INTERSECTING MULTIPLE CONTENT COMPONENT TYPES IN A SINGLE OPERATION

BACKGROUND OF THE INVENTION

1. Field of the Invention

This invention relates to document editing software and more particularly relates to editing a region of a document intersecting multiple content component types in a single operation.

2. Description of the Related Art

Electronic text documents are relied upon daily throughout the world. Creating electronic text documents using computer software is a common task that is well understood. Documents containing graphics and images, in addition to text, are now increasingly more common due to powerful computer hardware and software and the widespread use of digital cameras.

For example, a consumer product manual may include content components of three different types: text, graphics, and images. Typically, such manuals use text to describe how to use a product, drawings to illustrate a detailed portion of the product, and a photographs (an example of an image) to depict the product in use. The use of multiple types of content components in a document provides a powerful method of educating a reader.

Creating a document containing multiple types of content components, suitable for electronic or paper publishing, typically requires editing the position, size, appearance, and format of each content component. Functions such as cropping, erasing, color correction, and the like can be applied to each content component to prepare the document for publication.

Conventional document editing tools, such as desktop publishing software and word processing software, enable editing functions such as the ones described above. Typically, conventional document editing tools apply a function to one content component at a time. For example, conventional software requires a text content component and an image content component to be cropped in two distinct operations.

FIG. 1A illustrates a typical graphical user interface 100 for editing a document 102. The document 102 comprises a text content component 104 and an image content component 106. A user may wish to erase a first region 108 of both the text content component 104 and the image content component 106 in a single operation. However, conventional tools require the user to edit each content component 104,106 individually. First, the user selects a second region 110 of the image content component 106 to be erased. The tool then erases the portions of the image content component 106 within the second region 110.

FIG. 1B illustrates an edited version 112 of the document 102 after the erase operation has been performed. The tool has erased the second region 110 of the image content component 106. Next, the user selects a third region 114 containing portions of the text content component 104. The user then applies the erase function to the third region 114 to erase the remaining portion of the first region 108.

Conventional tools are typically not able to select a single region 108 intersecting both the text content component 104 and the image content component 106 and apply a single erase function to the first region 108. Instead, as described above, the user selects and erases a second region 110 of the image content component 106, then the user selects and erases a third region 114 of the text content component 104.

From the foregoing discussion, it should be apparent that a need exists for an apparatus, system, and method for editing a region 108 of a document 102 intersecting multiple content component types in a single operation. Beneficially, such an apparatus, system, and method would minimize time spent editing by reducing the number of steps required to edit a document 102. Additionally, the apparatus, system, and method would make editing a document 102 more intuitive to a user by allowing the document 102 to be edited regardless of the underlying content components 104,106 comprising the document 102.

SUMMARY OF THE INVENTION

The present invention has been developed in response to the present state of the art, and in particular, in response to the problems and needs in the art that have not yet been fully solved by currently available document editing software. Accordingly, the present invention has been developed to provide an apparatus, system, and method for editing a region of a document intersecting multiple content component types in a single operation that overcome many or all of the above-discussed shortcomings in the art.

The apparatus to edit a region of a document intersecting multiple content component types in a single operation is provided with a logic unit containing a plurality of modules configured to functionally execute the necessary steps of editing. These modules in the described embodiments include an input module, a function module, an identification module, a processing module, and an output module.

The input module receives a description of a region of a document. The region intersects a plurality of content component types. The function module obtains a function to be applied to the region. The identification module identifies a set of content components intersecting the region. Preferably, each content component is text, an image, or a graphic. The processing module processes intersecting portions of the content components using the function. The output module updates the document with processed intersecting portions of the content components.

The apparatus is further configured, in one embodiment, to include a format module and a conversion module. The format module determines an acceptable content component format for the function obtained by the function module. The conversion module converts the intersecting portions of the content components to the acceptable format.

In a further embodiment, the document may be a scanned document held in memory. The apparatus is further configured, in one embodiment, to comprise stand-alone software executing on a computer. Alternatively, the apparatus may comprise plug-in software for use with a host software application, such as Adobe® Acrobat®.

A system of the present invention is also presented for editing a region of a document intersecting multiple content component types in a single operation. In particular, the system, in one embodiment, includes a scanner and a document editing module. The document editing module includes an input module, a function module, a processing module, and an output module.

The input module receives a description of a region of a document scanned by the scanner and held in memory. The region intersects a plurality of content component types. The function module obtains a function to be applied to the region. The identification module identifies a set of content components intersecting the region. The processing module processes intersecting portions of the content components using the function obtained by the function module. The output module updates the document with processed intersecting portions of the content components.

The system may further include a format module and a conversion module. The format module determines an acceptable content component format for the function. The conversion module converts the intersecting portions of the content components to the acceptable format. The document editing module is further configured, in one embodiment, to execute on the scanner. Alternatively, the document editing module may execute on a stand-alone computer either connected directly to the scanner or coupled to the scanner by a network.

A method of the present invention is also presented for editing a region of a document intersecting multiple content component types in a single operation. The method in the disclosed embodiments substantially includes the steps necessary to carry out the functions presented above with respect to the operation of the described apparatus and system. In one embodiment, the method includes receiving a description of a region of a document, obtaining a function to be applied to the region, identifying a set of content components intersecting the region, processing intersecting portions of the content components using the function, and updating the document with processed intersecting portions of the content components.

Preferably, the function may comprise a function to crop, erase, deskew, despeckle, brighten, darken, color adjust, reduce red-eye, color correction, or adjust the contrast of the selected region. The method may also include determining one or more acceptable content component formats for the function, converting the intersecting portions of the content components to one of the acceptable formats, and storing the updated document in a single file.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
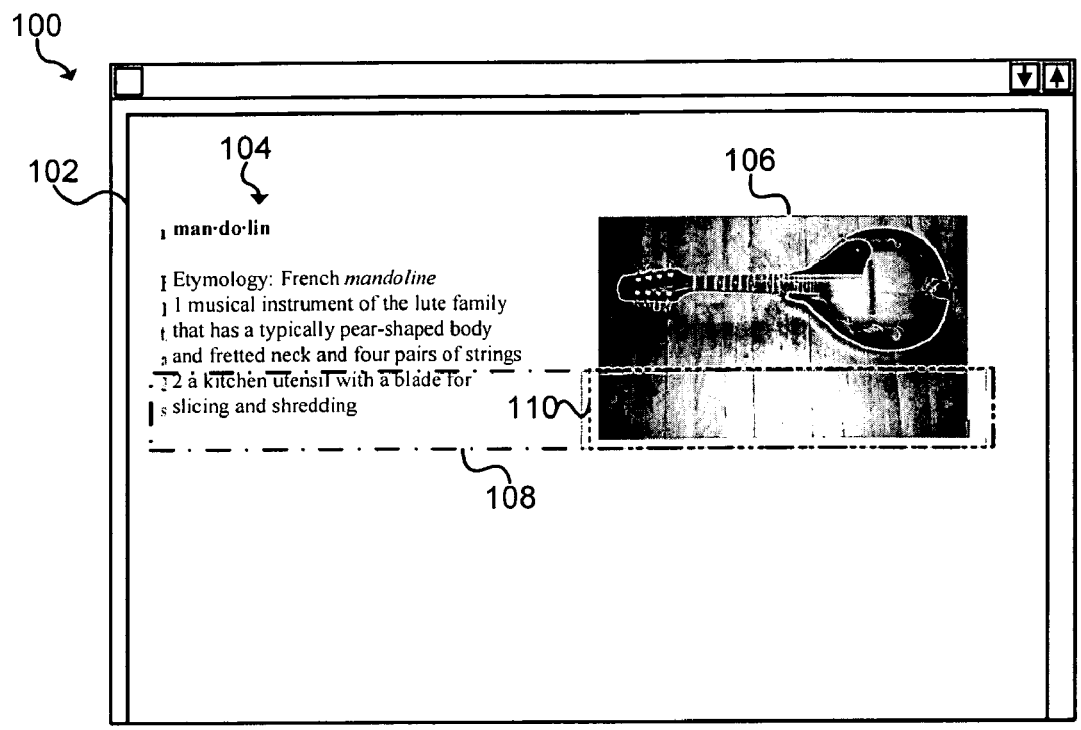
FIG. 1A is a graphical user interface illustrating a conventional method for selecting a region of a document.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
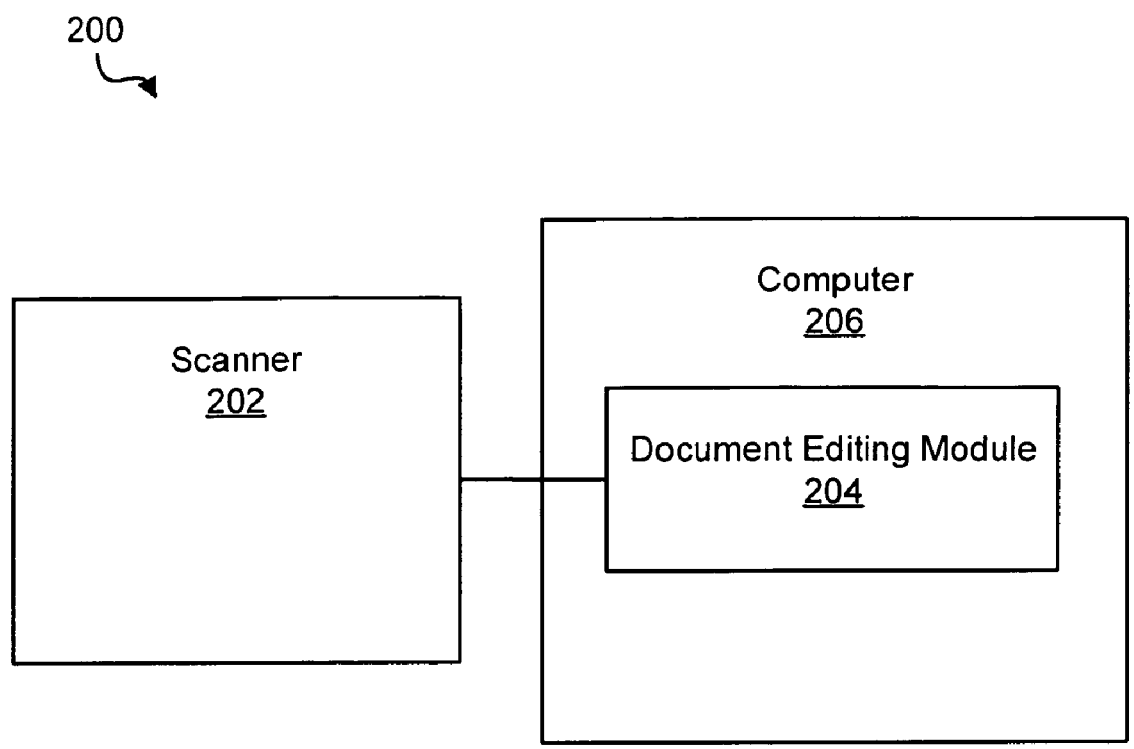
FIG. 2 is a schematic block diagram illustrating one embodiment of a system for editing a region of a document intersecting multiple content component types in a single operation in accordance with the present invention.

FIG. 2 depicts a system 200 for editing a region of a document intersecting multiple content component types in a single operation. The system 200 includes a scanner 202 and a document editing module 204. The scanner 202 scans a paper document and creates an electronic version of the paper document. The electronic version may be stored in memory. The scanner 202 may automatically partition the electronic version of the paper document into one or more content sections.

The document editing module 204 enables a user to edit a region of an electronic document in a single operation. The region intersects multiple content component types. The document editing module 204 may edit the electronic version of the paper document placed in memory by the scanner 202. The document editing module 204 may comprise software that executes on the hardware components of the scanner 202.

Alternatively, the document editing module 204 may comprise software that executes on a stand-alone computer 206 such as a personal computer, server, or mainframe computer. A network may couple the scanner 202 to the stand-alone computer 206, or the scanner 202 may be directly connected to the stand-alone computer 206.

Figure 3:
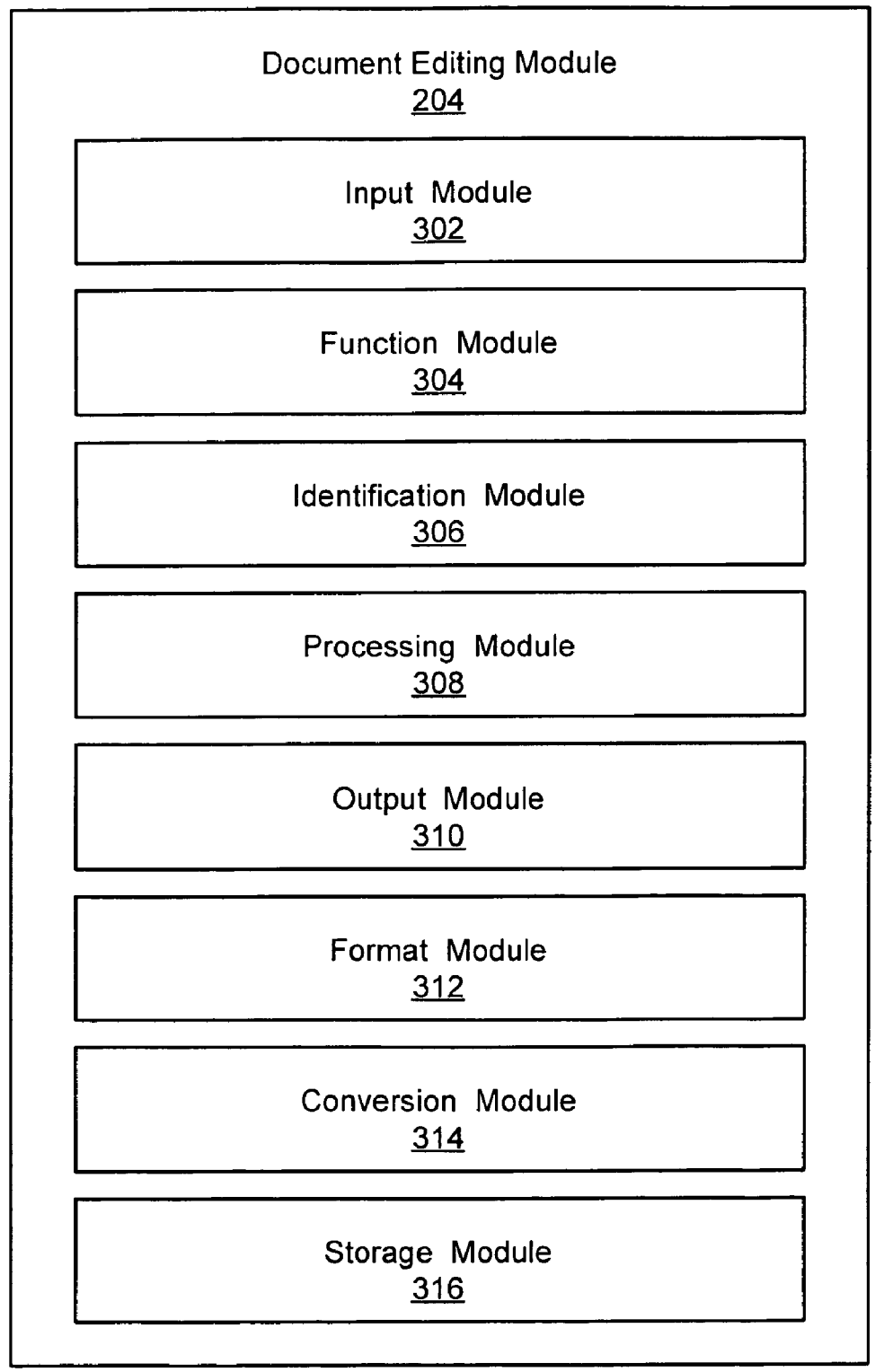
FIG. 3 is a schematic block diagram illustrating one embodiment of an apparatus for editing a region of a document intersecting multiple content component types in a single operation in accordance with the present invention.

FIG. 3 illustrates an apparatus 300 for editing a region of a document intersecting multiple content component types. The apparatus 300 comprises a document editing module 204 that includes an input module 302, a function module 304, an identification module 306, a processing module 308, and an output module 310.

The input module 302 receives a description of a region of a document. The region intersects a plurality of content component types. The description of the region may be a rectangular or polygonal region of the document that the user selects using a pointing device such as a mouse, trackball, or the like. The content component type may comprise a graphic, text, or image.

The function module 304 obtains a function to be applied to the region. The function may comprise cropping, erasing, deskewing, despeckling, brightening, darkening, color adjusting, reducing red-eye, color correction, adjusting contrast, or the like. Such functions are commonly used in content component editing software and are well known to those of skill in the art. The identification module 306 identifies a set of content components intersecting the region.

Preferably, the apparatus 300 further comprises a format module 312, a conversion module 314, and a storage module 316. The format module 312 determines an acceptable content component format for the function obtained by the function module 304. The conversion module 314 converts the intersecting portions of the content components to the acceptable format determined by the format module 312. For example, to perform a particular function the conversion module 314 may need to convert a content component to grayscale format.

The processing module 308 processes intersecting portions of the content components identified by the identification module 306 using the function obtained by the function module 304. The output module 310 updates the document with processed intersecting portions of the content components provided by the processing module 308.

The apparatus 300 may comprise stand-alone software executing on a computer 206 (See FIG. 2) such as a personal computer, server, or mainframe. In one embodiment, the apparatus comprises plug-in software for use with a host software application such as Adobe® Acrobat®.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
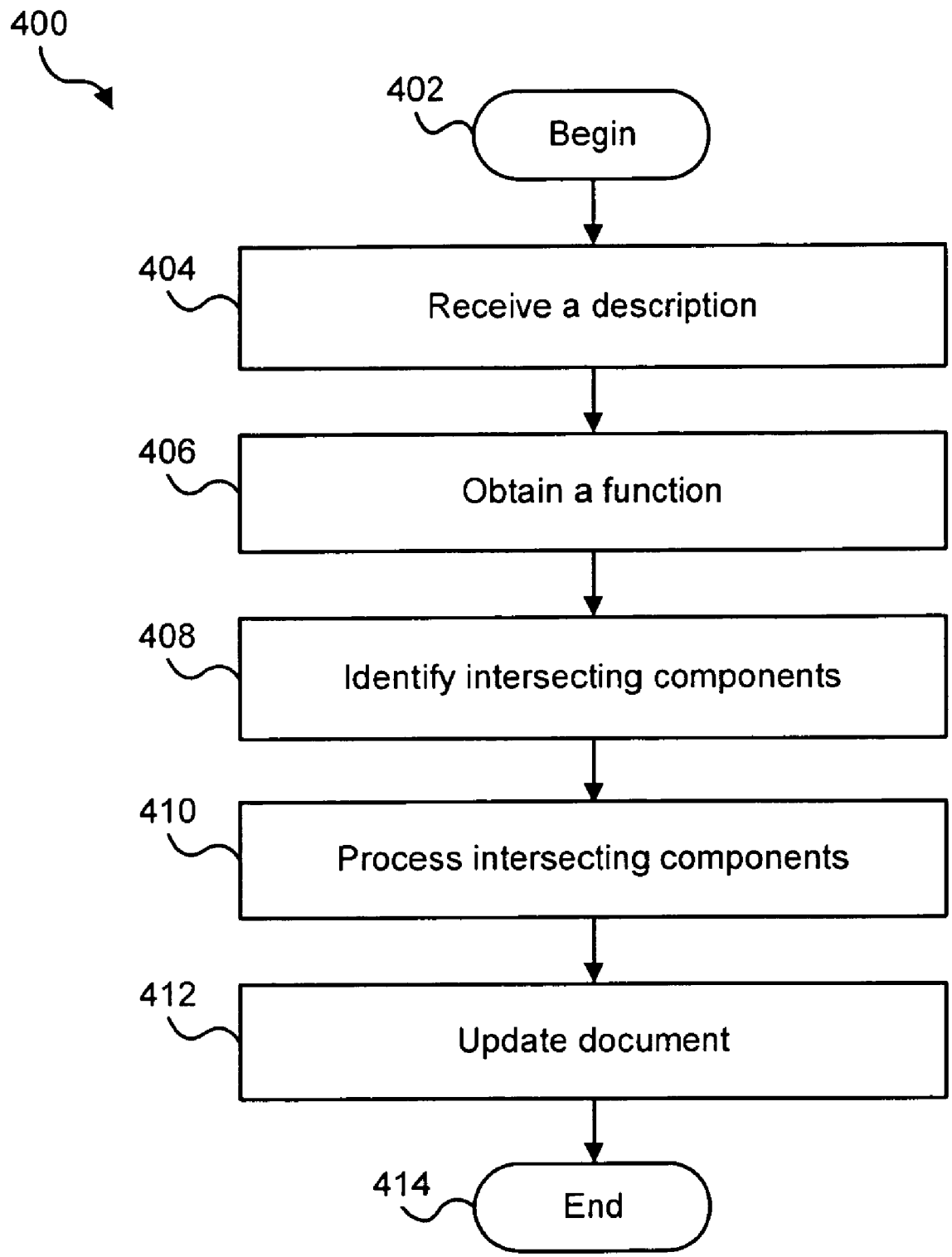
FIG. 4 is a schematic flow chart diagram illustrating one embodiment of a method for editing a region of a document intersecting multiple content component types in a single operation in accordance with the present invention.

FIG. 4 illustrates a method 400 for editing a region of a document intersecting multiple content component types. The method 400 begins 402 when the input module 302 (See FIG. 3) receives 404 a description of a region of a document wherein the region intersects a plurality of content component types. The document editing module 204 (See FIG. 3) may present the document directly to a user, or may rely on a host application to present the document. In one embodiment, the document comprises an electronic document scanned by a scanner 202 (See FIG. 2) and held in memory.

Figure 5A:
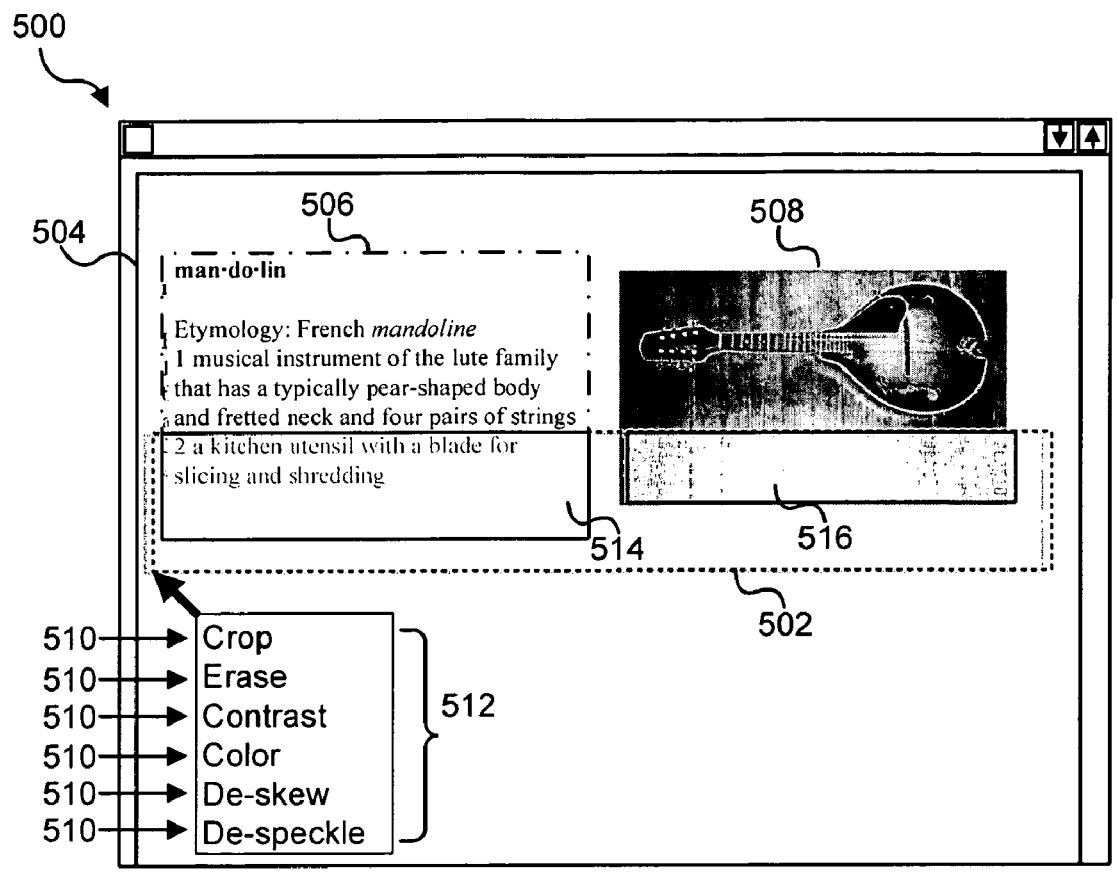
FIG. 5A is a graphical user interface illustrating editing a region of a document intersecting multiple content component types in a single operation.

FIG. 5A illustrates one example of a graphical user interface 500 for editing a region 502 of a document 504. The description of the region 502 may comprise a rectangular or polygonal region of the document 504 that a user creates using a pointing device such as a mouse, trackball, or the like. In the depicted graphical user interface 500, the user selected a rectangular region 502 containing portions of a text content component 506 and an image content component 508 using a mouse. The document editing module 204 may enable a user to define the region 502 directly by providing a tool for creating a rectangle or polygon that defines the region 502.

Alternatively, the document editing module 204 may rely on a host software application or operating system to enable a user to define the region 502. For example, if the document editing module 204 comprises plugin software, the host application may provide the description of the selected region 502 to the document editing module 204. The description of the selected region 502 may comprise a set of numerical coordinates, vectors, variables, or other data structures specifying the position of the region 502 within the document 504.

Each content component 506,508 has a type attribute. The content component type may be text, image, or graphic. Text content components 506 comprise a plurality of alphanumeric characters that may be arranged as a column, panel, frame, paragraph, or other layout. Typically, a text content component 506 is contained to a single page of the document 504. Graphic content components comprise artwork such as clip art, logos, or drawings. Image content components 508 comprise digital photographs and images scanned by a scanner 202. The region 502 illustrated in FIG. 5A intersects the text content component 506 and the image content component 508.

Returning now to FIG. 4, the function module 304 (See FIG. 3) obtains 406 a function to apply to the region 502 (See FIG. 5). The document editing module 204 may enable the user to select a function 510 from a set of functions 512. For example, in FIG. 5A after the user selects a region 502 using a mouse or other pointing device, the document editing module 204 may present the user with a set of functions 512 (See FIG. 5) in response to the user pressing the right mouse button. The user then selects one of the functions 510 using the left mouse button. Of course, the document editing module 204 could present the set of functions 512, and enable the user to select a function 510 in response to other button presses or keystrokes.

Alternatively, the document editing module 204 may rely on another software application to provide the selected function 510. For example, if the document editing module 204 comprises plugin software, the host application may provide the selected function 510 to the function module 304.

The function 510 may comprise a function 510 to crop, erase, deskew, despeckle, brighten, darken, color adjust, reduce red-eye, color correction, or adjust contrast. Of course, the document editing module 204 could also implement other functions 510. The document editing module 204 may allow future functions to be added to the document editing module 204 as future functions are developed.

Next, the identification module 306 (See FIG. 3) identifies 408 a set of content components 506,508 intersecting the region 502. For example, in FIG. 5A the text content component 506 and the image content component 508 both intersect the region 502. The content sections 506,508 intersect the region 502 but do not need to be fully contained by the region 502.

After determining which content components 506,508 intersect the region 502, the identification module 306 determines which portions of the intersecting content components 506,508 lay within the region 502. The portions contained by the region 502 are referred to herein as intersecting portions. For example, in FIG. 5A the intersecting portion 514 of the text content component 506 and the intersecting portion 516 of the image content component 508 are illustrated as shaded rectangles.

Returning now to FIG. 4, the processing module 308 (See FIG. 3) processes 410 the intersecting portions 514,516 of the content components 506,508 according to the selected function 510. For example, the intersecting portions 514,516 may be cropped. The algorithms the processing module 308 uses to perform the selected function 510 are well known to those of skill in the art.

Next, the output module 310 updates 412 the document 504 with the processed intersecting portions of the content components 506,508. The output module 310 may replace the portion of the document 504 previously occupied by the intersecting portions 514,516 with the processed intersection portions.

For example, in FIG. 5A a single region 502 is selected that intersects two content components 506,508. The processing module 308 applies the erase function 510 to the region 502. The processing module 308 erases the intersecting portions 514,516 of the text content component 506 and image content component 508 in a single operation.

Figure 1B:
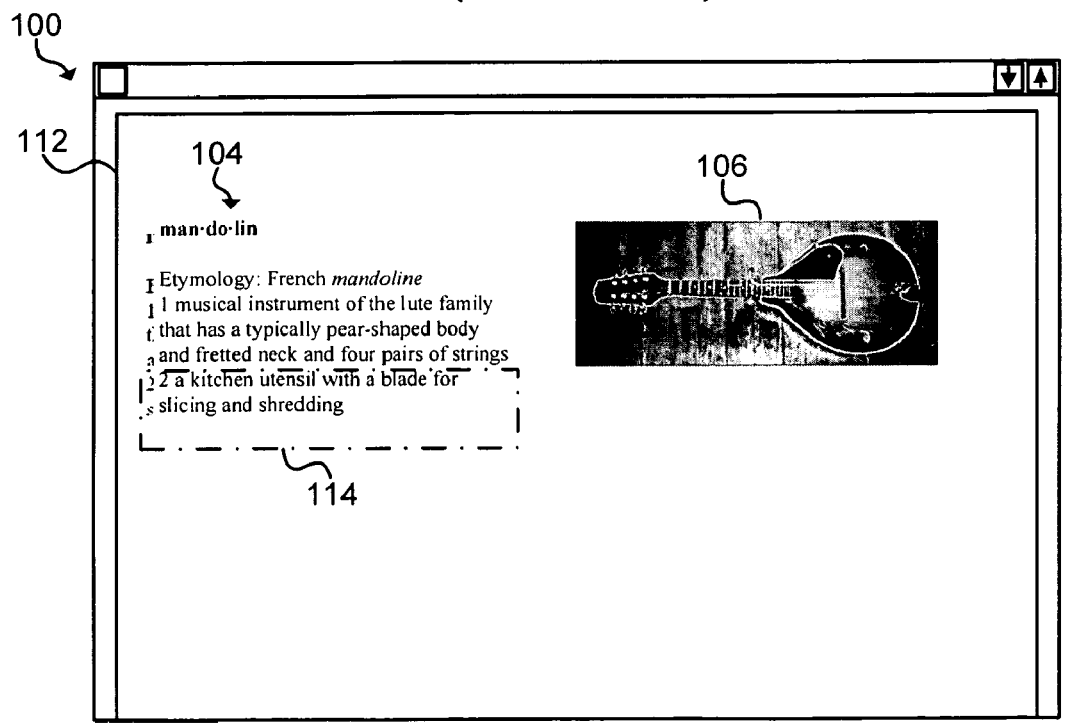
FIG. 1B is a graphical user interface illustrating a document edited using a conventional method.
Figure 5B:
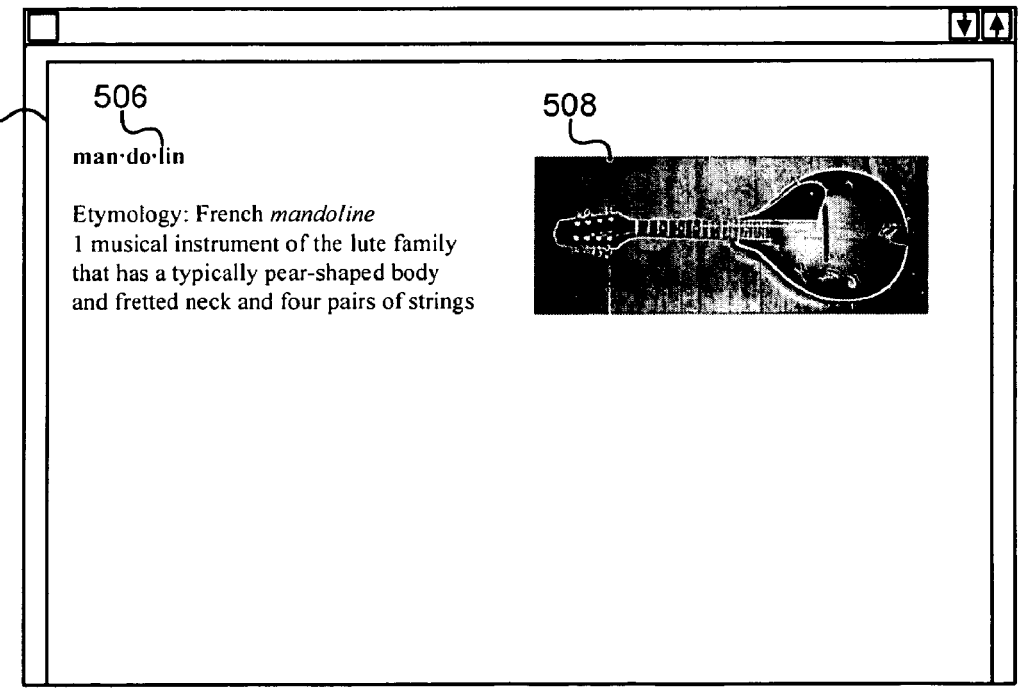
FIG. 5B is a graphical user interface illustrating a document intersecting multiple content component types edited in a single operation.

FIG. 5B illustrates an updated document 518 wherein the selected region 502 has been erased. In contrast, conventional document editing tools, such as the one illustrated in FIGS. 1A-1B require at least two operations: one to erase a first portion 114 of the text content component 104 and another to erase a second portion 110 of the image content component 106. (See FIGS. 1A-1B)

After updating the document 504, the document editing module 204 may update the displayed document 518 viewed by the user directly. Alternatively, the document editing module 204 may rely on another software application to update the displayed document 518. For example, if the document editing module 204 comprises a software plugin, the host application may display the updated document 518 after the output module 310 updates the document 504. The method 400 ends 414.

Figure 6:
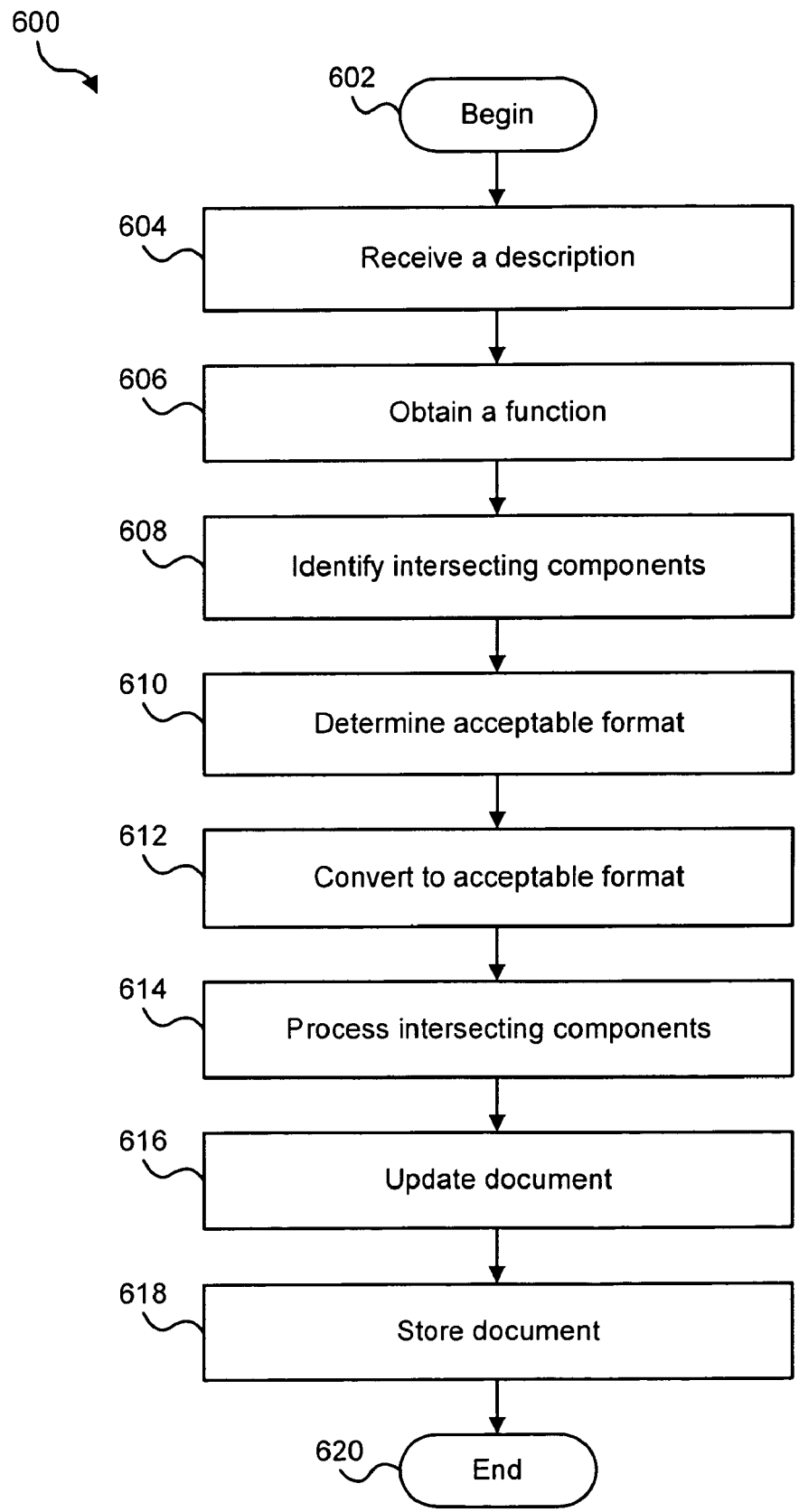
FIG. 6 is a schematic flow chart diagram illustrating one embodiment of a detailed method for editing a region of a document intersecting multiple content component types in a single operation in accordance with the present invention.

FIG. 6 illustrates an additional embodiment of a method 600 for editing a region 502 of a document 504 intersecting multiple content component types. The method 600 begins 602 when the input module 302 (See FIG. 3) receives 604 a description of a region 502 of a document 504 wherein the region 502 intersects a plurality of content component types.

Next, the function module 304 obtains 606 a function 510 to apply to the region 502. The identification module 306 identifies 608 a set of content components 506,508 intersecting the region 502. The above steps are performed in substantially the same manner as described above in relation to FIGS. 4, 5A, and 5B.

Next, the format module 312 (See FIG. 3) determines 610 an acceptable content component format for the function 510 obtained by the function module 304. The processing module 308 may not be able to perform a function 510 on a particular content component 506,508 unless the content component 506,508 is in a specific format. Sample formats for an image content component 508 include black and white, grayscale, 16-bit color, 32-bit color, and other formats well known to those of skill in the art.

The selected function 510 may require that the content component 506,508 be in a particular format before the processing module 308 performs the selected function 510. For example, to adjust the contrast of a content component 506,508 the content component 506,508 may need to be in grayscale format. The document editing module 204 maintains data about the format each function 510 requires. The format module 312 may determine the acceptable format for the desired function 510 using a table, variable, file, software function call, software signal, a software event, or other data exchange to interact with the document editing module 204.

In one embodiment, the format module 312 determines a plurality of acceptable content component formats for the selected function 510. Some functions 510 may accept more than one content component format. For example, a color correction function 510 may work with both a 16-bit color format and a 32-bit color format.

Next, the conversion module 314 converts 612 the intersecting portions 514,516 of the content components 506,508 to one of the acceptable formats. The conversion module 314 may convert the intersecting portion 514,516 of the content component 506,508 to the format required by the processing module 308, as determined by the format module 312. The conversion module 314 may use a readily available algorithm to perform the conversion. Such algorithms are well known to those of skill in the art.

Next, the processing module 308 processes 614 intersecting portions 514,516 of the content components 506,508 using the function 510. The output module 310 updates 616 the document 504 with processed intersecting portions of the content components 506,508 in substantially the same manner as described above in relation to FIG. 4. The storage module 316 then stores 618 the updated document 518 in a single file. The single file may be in a format such as a markup language format, word processing format, multimedia format, electronic publishing format, or the like. The method 600 ends 620.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing device for editing a user-defined region of a document intersecting multiple content component types in a single operation, the computing device comprising:
an input module configured to receive a description of a region of the document, the user-defined region intersecting a plurality of content component types;
a function module configured to obtain a function to be applied to the user-defined region;
an identification module configured to identify a set of content components intersecting the user-defined region received by the input module;
a processing module configured to process intersecting portions of the content components using the function;
a format module configured to determine an acceptable content component format for the function;
a conversion module configured to convert the intersecting portions of the content components to the acceptable format; and
an output module configured to update the document with processed intersecting portions of the content components
wherein the output module updates the document when the computing device is in use.

2. The computing device of claim 1, wherein each content component has a type selected from the group consisting of text, an image, and a graphic.

3. The computing device of claim 1, wherein the document comprises a scanned document held in memory.

4. The computing device of claim 1, wherein the computing device comprises stand-alone software executing on a computer.

5. The computing device of claim 1, wherein the computing device comprises plug-in software for use with a host software application.

6. A system for editing a user-defined region of a document intersecting multiple content component types in a single operation, the system comprising:
a scanner;
a document editing module including:
an input module configured to re a description of a user-defined region of a document scanned by the scanner and held in memory, the region intersecting a plurality of content component types;
a function module configured to obtain a function to be applied to the user-defined region;
an identification module configured to identify a set of content components intersecting the user-defined region received by the input module;
a processing module configured to process intersecting portions of the content components using the function;
a format module configured to determine an acceptable content component format for the function;
a conversion module configured to convert the intersecting portions of the content components to the acceptable format; and
an output module configured to update the document with processed intersecting portions of the content components wherein the output module updates the document when the system is in use.

7. The system of claim 6, wherein the document editing module executes on the scanner.

8. The system of claim 6, wherein the document editing module executes on a stand-alone computer.

9. The system of claim 8, wherein the scanner is coupled to the stand-alone computer through a network.

10. The system of claim 8, wherein the scanner is directly connected to the stand-alone computer.

11. A method for editing a user-defined region of a document intersecting multiple content component types in a single operation, the method comprising:
receiving a description of a user-defined region of a document, the region intersecting a plurality of content component types;
obtaining a function to be applied to the region;
identifying a set of content components intersecting the user-defined region received by the input module;
processing intersecting portions of the content components using the function;
determining an acceptable content component format for the function;
converting the intersecting portions of the content components to the acceptable format; and
updating the document with processed intersecting portions of the content components.

12. A computer-readable storage medium tangibly embodying a program of machine-readable instructions executable by a digital processing apparatus to perform steps to edit a user-defined region of a document intersecting multiple content component types in a single operation, the steps comprising:
receiving a description of a user-defined region of a document, the region intersecting a plurality of content component types;
obtaining a function to be applied to the user-defined region;

identifying a set of content components intersecting the user-defined region;

processing intersecting portions of the content components using the function;

determining an acceptable content component format for the function;

converting the intersecting portions of the content components to the acceptable format; and updating the document with processed intersecting portions of the content components.

13. A computer-readable storage medium of claim 12, further comprising a step of determining a plurality of acceptable content component formats for the function.

14. The computer-readable storage medium of claim 12, wherein each content component has a type selected from the group consisting of text, an image, and a graphic.

15. The computer-readable storage medium of claim 12, wherein the function is selected from the group consisting of crop, erase, deskew, despeckle, brighten, darken, color adjust, reduce red-eye, color correct, and adjust contrast.

16. The computer-readable storage medium of claim 12, further comprising a step of storing the updated document in a single file.

17. The computer-readable storage medium of claim 12, wherein the region intersects a plurality of content components having a plurality of types.

18. The computer-readable storage medium of claim 12, wherein the document comprises a scanned document held in memory.

19. An computing device for editing a user-defined region of a document intersecting multiple content component types in a single operation, the apparatus comprising:

a means for receiving a description of a user-defined region of a document, the region intersecting a plurality of content component types;

a means for obtaining a function to be applied to the user-defined region;

a means for identifying a set of content components intersecting the user-defined region;

a means for processing intersecting portions of the content components using the function;

a means for determining an acceptable content component format for the function;

a means for converting the intersecting portions of the content components to the acceptable format;

and a means for updating the document with processed intersecting portions of the content components wherein the apparatus updates the document when in use.

* * * * *